United States Patent [19]
Feig

[11] Patent Number: 5,426,655
[45] Date of Patent: Jun. 20, 1995

[54] METHOD AND APPARATUS FOR MAGNETIC RECORDING OF DATA

[75] Inventor: Ephraim Feig, Briarcliff Manor

[73] Assignee: International Business Machines Corporation, Armonk, N.Y.

[21] Appl. No.: 204,908

[22] Filed: Mar. 1, 1994

Related U.S. Application Data

[63] Continuation of Ser. No. 720,856, Jul. 16, 1991, abandoned.

[51] Int. Cl.⁶ .................... G06F 11/10; H03M 13/00
[52] U.S. Cl. ................................ 371/49.3; 371/40.1
[58] Field of Search ................ 371/39.1, 40.1, 45, 371/49.3; 360/47, 53

[56] References Cited

U.S. PATENT DOCUMENTS

| | | | |
|---|---|---|---|
| 3,938,083 | 2/1976 | Stansfield | 371/49.3 |
| 4,005,405 | 1/1977 | West | 371/49.3 |
| 4,209,810 | 6/1980 | Ragle et al. | 360/77 |
| 4,626,928 | 12/1986 | Nagano | 360/29 |
| 4,791,643 | 12/1988 | Molstad et al. | 371/39.1 |

Primary Examiner—Robert W. Beausoliel, Jr.
Assistant Examiner—Glenn Snyder
Attorney, Agent, or Firm—Daniel P. Morris

[57] ABSTRACT

Data to be recorded on a magnetic disk is binary encoded including standard error control coding. The data is divided into contiguous blocks and mapped into a sequence of complex numbers according to a predetermined set of coding rules. The mapped data is then recorded on the odd and even tracks on the disk in substantially orthogonal assignments. The orthogonalization technique is used to reduce if not avoid entirely off track interference. Where it is desired to read data from an even track but the head infringes on one of its odd neighbors, the head reads a slightly weaker signal from the desired even track, because the head is not completely over it, and a weak signal from the neighboring odd track. The interfering signal from the odd track does not appear as noise in the even entries of the post inverse Fourier transform sequence, which is used for decoding.

4 Claims, 13 Drawing Sheets

METHOD AND APPARATUS FOR MAGNETIC RECORDING OF DATA

This is a continuation of appication Ser. No. 07/720,856, filed Jul. 16, 1991, now abandoned.

FIELD OF THE INVENTION

The present invention generally concerns magnetic recording. More specifically, the invention concerns linear magnetic recording of digital data on essentially parallel recording tracks.

BACKGROUND ART

Magnetic recording devices such as magnetic disk drives are widely used for storing digital data. In such devices, the data is typically stored on the surface of moving magnetic media such as rigid or flexible magnetic disks, magnetic tapes or magnetic drums. Data is generally recorded on such magnetic media in magnetic recording tracks which extends generally linearly along the surface of the media.

The track width of a magnetic recording system at which the storage capacity is maximized has been estimated.

- T. Howell and E. Feig, IEEE International Symposium of Information Theory, Ann-Arbor, Mich., Oct 6-9, 1986;
- J. C. Mallinson, *IEEE Trans. Magn.*, vol. MAG-10, pp. 368-373, (June 1974);
- D. F. Eldridge, *IEEE Trans. Audio.*, vol. AU-11, pp. 3-6, January-February 1963.

The approach was to apply Shannon's formula for the information capacity of a communications channel C. E. Shannon, *Bell Syst. Tech. J.* 27, pp. 623-656, (October 1958) It was concluded in line with an information theoretical tenet that "a plethora of low-performance channels has a greater capacity than a single channel of high performance." In these earlier works, the noise power in the channel was assumed to depend linearly on the track width. This is a property of media noise, which was assumed there to be the fundamental limitation in recording. Signal power, on the other hand, grows quadratically with track width. These earlier works concluded that storage capacity is fundamentally a monotonically increasing function of track density.

In a more recent study electronic noise was added to the analysis. T. Howell and E. Feig, IEEE International Symposium of Information Theory, Ann-Arbor, Mich., Oct 6-9, 1986; Electronic noise is characterized by being essentially constant, effectively independent of track width. Optimality was no longer achieved assymptotically by increasing arbitrarily track density. Instead, capacity first peaked and then dropped assymptotically to zero as the number of tracks was increased. The problem of interference from neighboring tracks was not considered.

A major contributor to signal degradation in conventional magnetic recording devices is interference from neighboring tracks due to imperfect servo mechanics. Neighboring track interference becomes critical as tracks become narrower, because then the ratio of the interfering signal to desired signal increases. Moreover, the power of the interfering signal also grows quadratically with the width of that portion of the head which slides over it. Mallinson has stated that "it is safe to conclude that purely mechanical limitations, primarily related to the difficulty of keeping the reproduce head on track while in the reproduce mode, will impose more stringent ultimate limitations than those associated with purely electrical or magnetic phenomena."

- J. C. Mallinson, *Proceedings IEEE*, (February 1976);
- M. Wildmann, *IEEE Trans. Magn.*, vol. MAG-10, pp. 509-514, (September 1974).

The analysis of the Howell and Feig presentation can be extended to incorporating the servo issue into the model. The resulting analysis gives a qualitative picture of the effects on channel capacity of the various contributing noise sources. It is assumed that the servo mechanics are such that the deviations from center track are random, Gaussian with zero mean and variance $\sigma^2$. The magnetic recording head width is allowed to be narrower that the track width. With the usual read/write methods, the principle of "write wide-read narrow" seems justifiable, as far as channel capacity is concerned. Channel capacity is increased if narrower tracks are used. However, the ratio of head-width to track-width to achieves maximum capacity decreases with decreasing values of track-width until an optimal head-width/track-width combination is obtained, after which the ratio increases asymptotically to one. The initial drop in ratio arises in part because the interfering signals from the neighboring tracks become more and more significant as the tracks get narrower.

Writing narrower tracks tends to introduce "dead regions" which yield signals which are faulty over some significant interval of time. With wide tracks, faulty media spots are but a speck with respect the rest of the media defining the track width. These specks become more and more damaging as tracks get narrower.

SUMMARY OF THE INVENTION

The present invention concerns a magnetic recording device and method for storing and retrieving digital information. The magnetic recording device includes a magnetic storage media which is optimized for AC-biased recoding and a magnetic transducer head adapted for AC-bias magnetic transducing.

In what follows the invention will be described in terms of a magnetic disk, although it will be appreciated that the invention can involve other magnetic recording media as well.

In the method of the invention, data to be recorded on a magnetic disk is encoded in some desirable binary fashion. Preferably the binary coding includes standard error control redundancies and coding. The data thus encoded is divided into contiguous blocks and is mapped into a sequence of complex numbers according to a predetermined set of coding rules. The complex numbers may be members of constellations for various conventional coding schemes, known in the art as QAM, PSK, CROSS and other trellis-coded modulation designs. The specific form of mapping from the string of binary data to the sequence of complex numbers is not the concern of this invention. Methods for implementing the mapping into a sequence of complex numbers can be found in the following publications, which are incorporated herein by reference:

1) A. Peled and A. Ruiz, *Proc, IEEE International Conference on Acoustics, Speech, and Signal Processing*, Denver Colo. pp. 964-967; (April 1980),
2) F. Mintzer and T. Howell, OBM-RC 9429 (#41644), (16 Jun. 1982);
3) E. Feig and F. Mintzer, IBM-RC 13701 (#60788), (14 Mar. 988); and 4) S. B. Weinstein and P. M. Ebert, *IEEE Trans. Comm.*, vol. COM-19, pp. 628–634, (October, 1971).

The generic name for these techniques is digital frequency division multiplexing, also referred to in the literature as Fourier Transform Division Multiplexing ("FTDM").

Preferably the data is mapped into a sequence of length N which is a power of two, which is particularly amenable to fast fourier transform ("FFT") computation. More preferably, N is in the range from 256 to 4096. The choice of N depends in part on the speed of the hardware used to perform the fast fourier transform and on the peak power handling capability of the magnetic transducer head.

The invention involves numbering the tracks of the disk so that adjacent tracks have track numbers of different parity. In other words, for each pair of adjacent tracks, one will have an even track number and the other an odd track number. The invention further involves mapping data to be recorded on the even and odd tracks on the disk in substantially orthogonal assignments. Data to be written on the even tracks is mapped only onto the even-indexed entries of a sequence, with the odd-indexed entries being assigned the value 0. Data to be written on the odd tracks is mapped only onto the odd indexed entries of the sequence, with the even indexed entries being assigned the value 0.

Once the mapping of the binary data to the sequence of complex numbers is accomplished, its reverse-conjugate sequence is augmented to it, preferably in front of it, forming a sequence of length 2N. The augmented sequence has the property that the j-th entry from the beginning equals the conjugate of the j-th entry from the end. The new augmented sequence is subjected to an fast fourier transform computation which yields a sequence of real numbers of length 2N.

To the sequence of real numbers of length 2N a small initial segment of the sequence may be augmented, preferably to the tail. The length L of the buffer segment corresponds to the duration of the memory of the channel due, for example, to the head response. This procedure is called a cyclic extension, and has been suggested to compensate an intersymbol interference problem which is inherent to communication and storage channels.

The resulting cyclically extended, augmented sequence of real numbers of length 2N+L is passed through a digital-to-analog converter and then through a low pass filter to generated an analog signal for storing on the disk. The analog signal is passed into the magnetic write head to be written onto the disk in a substantially linear fashion, where the signal is stored.

During the read process, data is collected in contiguous blocks. Each block is sampled at the rate it was written, yielding 2N+L samples of real numbers. These are passed to an equalizer, as described in the Peled and Ruiz publication and the Mintzer and Howell publication cited above. The first 2N values of the equalizer output are subjected to an inverse fast fourier transform algorithm to yield a sequence of 2N complex numbers. The second half of the output of the inverser of the fast fourier transform are then routed to a pre-decoder-N complex numbers in all.

If the data comes from an even track, the pre-decoder routes only the even entries of the sequence to the decoder. The pre-decoder also checks the magnitudes of the numbers in the odd entries of the sequence. If they exceed a predetermined magnitude limit, then it is a sign that the magnetic head is infringing upon a neighboring track, and the pre-decoder signals for corrective action.

Alternately, if the data comes from an odd track, then the pre-decoder routes only the odd entries of the sequence to the decoder. The pre-decoder also checks the magnitudes of the numbers in the even entries of the equence. If they exceed a predetermined magnitude limit, then it is again a sign that the head is infringing upon a neighboring track, and the pre-decoder signals for corrective action.

The decoder, having received the data, proceeds to decode the data according to the inverse of method by which the data was encoded.

The orthogonalization method of the preferred embodiments of the invention can be used to reduce if not avoid entirely off-track interference. Suppose it is desired to read data from an even track, but the head infringes on one of its odd neighbors. In that case the head reads a slightly weaker signal from the desired even track because it is not completely over it. In addition the head reads a weak signal from the neighboring odd track. If the signals were not orthogonal, then the weak interference superposed on the weakened desired signal might induce errors in the decoding; the probability of error would become greater as the headtrack misalignment worsens. With the orthogonalization procedure of the invention, the head reads a slightly weaker signal from the desired even track superposed with a weak signal from the neighboring odd track. But after the inverse fast fourier transform stage, the contribution to the signal from the desired even track would appear only as even entries in the inverse fast fourier transform output sequence, whereas the contribution to the signal from the interfering odd track will appear only as odd entries in the inverse fourier transform output sequence. The magnitudes of the even entries will be slightly but essentially uniformly attenuated, because the head was not directly on the track. Such an attenuation can readily be compensated for, and then decoding is straightforward. The interfering signal appearing on the odd entries of the post inverse fast fourier transform sequence means that the interference essentially does not appear as noise in the even entries of the post inverse fourier transform sequence, which is used for decoding.

An analogous situation occurs when it is desired to read data from an odd track, but the head infringes on one of its even neighbors, and the decoding proceeds in a manner analogous to that presented in the previous paragraph, with even and odd roles interchanging.

Advantageously the invention utilizes linear magnetic recording techniques such as the AC-biased method. Consequently, useful information such as track numbering, buried-servo data, and timing information can be superposed on the data signal, to advantage. For example, during disk fabrication, low-frequency servo information can be "buried" in the disk sufficiently deep so that the AC-biased write process does not affect it. During readback, a low pass filter may be utilized to isolate this buried servo component from the data signal.

In a prior-art buried-servo scheme the data signal had residual power around DC in spite of a narrow frequency notch in the code at DC frequency. M. K. Haynes, *IEEE Trans. Magnetics*, vol. MAG-17 (6), pp. 2730–2734, (November 1978). In preferred embodiments of the present invention, in contrast, the data component signal has a relatively wide gap around DC. Thus, the servo information and the data can be essentially completely separated in the frequency domain. Servo information obtained by low pass filtering will not be corrupted by data infringement, nor will the data be corrupted by the low-frequency servo information. Furthermore, the servo information need only describe whether the head is infringing on the track to the right or to the left of the desired position. Since the data signal itself contains information as to whether the head is on track or not in the power in either the odd or even entries in the sequence after the inverse fourier transform. The buried servo information can be one of three distinct low frequency sinusoids arranged in a cyclical order. When the pre-decoder senses that the head is veering off track, it signals for corrective measures to be taken. The low-pass filter can isolate two of the three low frequency sinusoid signals in the buried servo, which is enough to tell whether the head is veering to the left or the right.

If desired, other data can be superposed right in the utilized frequency bins of the basic fourier transform division multiplexing scheme. Side information can be encoded conventionally in a time (space) division multiplexing fashion. In preferred embodiments of the invention there is the freedom to choose to either multiplex in time division, frequency division or both. In addition, special high-frequency components can be allocated for special information for special tasks such as timing control. These may produce somewhat weak signals since high frequencies are greatly attenuated, however, timing control signals do not need large signal-to-noise ratios to be effective. A particularly preferred embodiment would be to superpose a high frequency sinusoid sufficiently far from the data frequencies, so that it can be isolated easily with a filter. During readback, the reader can be phase-locked to this high frequency sinusoid for accurate timing control.

BRIEF DESCRIPTION OF THE DRAWINGS

Preferred embodiments of the present invention are described below with reference to the following drawings.

FIG. 2A: signal noise ratio of a channel with optimal headwidth/trackwidth ratio: FIG. 2C: corresponding computed channel capacity; FIG. 2B: computed optimal headwidth as function of trackwidth; FIG. 2D: computed optimal headwidth/trackwidth ratio.

FIG. 3A: computed optimal capacity as function of trackwidths; FIG. 3B: corresponding computed signal-to-noise ratio.

FIG. 4A computed optimal capacity as function of trackwidths; FIG. 4B: corresponding computed signal-to-noise ratio.

FIG. 5A: computed optimal capacity as function of trackwdiths; FIG. 5B: corresponding computed signal-to-noise ratio.

FIG. 8B: corresponding ratio of channel response divided by noise power spectrum.

FIG. 2B: corresponding computed output signal-to-noise ratio and signal-to-noise ratio needed to achieve an error rate of $10^{-7}$.

FIG. 11B: computed corresponding output signal-to-noise ratio.

FIG. 12B: corresponding computed output signal-to-noise ratio.

DESCRIPTION OF PREFERRED EMBODIMENTS

Figure 1A:
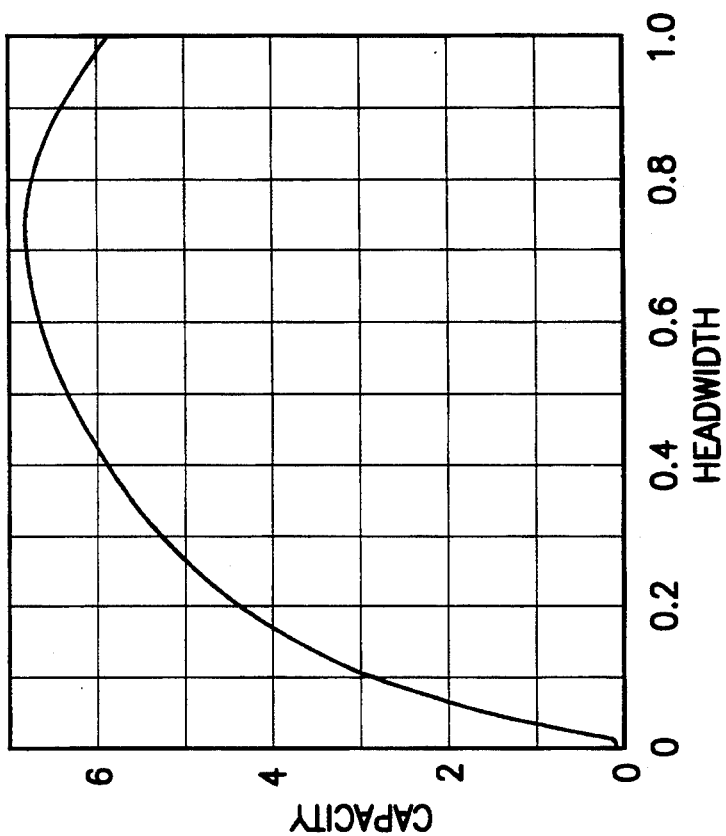
FIGS. 1A and 1B, graphs of the computed signal-to noise and capacity as function of headwidth for a typical magnetic disk channel having a track width of 1, and average signal power in $\bar{P}=200$, $\bar{N}_M=150$, $\bar{N}_E=50$, and $\sigma=0.15$.

A Linear Magnetic Recording of Digital Data

In the present invention, magnetic storage channels are linearized by AC-biasing. With AC-bias substantial signal-to-noise ratio is generally lost which can be recovered with signal processing techniques. This can be done with four tactics. The first utilizes the particular signal-to-noise characteristics of the channel, as function of frequency, to design practical coding/modulation schemes for high reliability with low signal-to-noise ratio. Such schemes for coding in the frequency domain have recently been described in the Peled and Ruiz publication and the Feig and Mintzer publication cited above. The second tactic reduces neighboring-track interference by writing mutually orthogonal in the frequency domain signals alternately on the even and odd numbered tracks. The third tactic provides methods for mitigating the effects of bursty noise. The fourth tactic uses the orthogonalized signals together with extra superposed information for continuous track servoing during playback. And to help with the writing, one can add buried servo in a frequency band around DC well separated from that which contains the data.

Orthogonalization can be achieved by decomposing the channel into two subchannels of even and odd numbered tracks. The written signal will be such that the discrete Fourier transform of sampled values on appropriately chosen intervals will have either all their even or all their odd entries equal to zero. The actual coding and modulation technique will be a modification of a Fourier Transform Coding (FTC) method, described in the Mintzer and Howell publication and the Peled and Ruiz publication cited above. The potential gains for these methods will be described using an idealized example of a typical channel, The orthogonalization method of the invention permits channel integrity to be maintained with very narrow tracks. During the write process, if the head infringes upon a neighboring track, the signal it partially overwrites will not be completely erased. Ordinarily, such partial erasure is enough to render the original data unreliable, as the coherent interference will prevent its accurate retrieval. With the invention, the spectrum of the superposed signal has its support disjoint from that of the spectrum of the prerecorded data, increasing the probability that there is still enough signal from the old data to make it legible. In fact, this consideration imposes the limits on track densities. During the read process, off-track signal will not interfere with the desired data signal.

The Effects of Track Misregistration on a Standard Channel

In the computer model simulations discussed below, normalized distance and time units are used for trackwidth and bandwidth, taking both equal to 1 as a reference. Let $\bar{P}$ denote the average signal power for this reference system, assuming perfect track-head alignment. Let $\bar{N}_M$ denote the media noise power for this reference system. The media noise power is not changed if the head should fringe over to a neighboring track. And let $\bar{N}_E$ denote the electronic noise power for this system, which is constant throughout.

Head-track misalignment affects both the write and the read process. Its affect on the write process is fundamentally more critical, because old data on a neighboring track may be destroyed which can never again be retrieved. As for track misalignment during the read process, a track can be scanned several times and the effects of track misregistration average out. In practice such delay can rarely be tolerated. To simplify capacity estimates, it is assumed that the misalignment character of the channel is the same during the write process as during the read process. The simplest way of studying this situation is to pretend that perfect tracks are being written and to double the variance of the head position relative to center track. This is what is done here. Capacity estimates should not be confused with performance analysis of particular write/read schemes, which should be done considering worst case situations.

We consider systems with tracks of width $W \leq 1$ and read heads of width $H \leq W$. Tracks are written perfectly, and guard bands are not used to separate neighboring tracks; the reader can easily extend our analysis to account for these situations. When reading back, center head position is assumed to be normally distributed with expected position at the center of the track and variance $\sigma^2$. For such a system we have media noise power $$N_M = H\bar{N}_M$$

and electronic noise power $$N_E = \bar{N}_E$$

The average power of the interfering signal is $$P_I = \frac{P}{\sigma \sqrt{2\pi}} \int_{-\infty}^{\infty} S_I(x)^2 e^{-x^2/\sigma^2} dx$$

where $$S_I(x) = \begin{cases} 0 & |x| \leq (W - H)/2 \\ x - \frac{W - H}{2} & (W - H)/2 \leq |x| \leq (W + H)/2 \\ H & |x| \geq (W + H)/2 \end{cases}$$

Similarly, we have for the average power of the desired signal $$P_S = \frac{P}{\sigma \sqrt{2\pi}} \int_{-\infty}^{\infty} S_S(x)^2 e^{-x^2/\sigma^2} dx$$

where $$S_S(x) = \begin{cases} H & |x| \leq (W - H)/2 \\ \frac{H + W}{2} - x & (W - H)/2 \leq |x| \leq (W + H)/2 \\ 0 & |x| \geq (W + H)/2 \end{cases}$$

We then estimate the channel capacity using the formula $$C = \frac{1}{W} \log_2 \left( 1 + \frac{P_S}{P_I + N_M + N_E} \right)$$

Notice that we have added the individual contributing noise powers to obtain the denominator in the expression for our signal-to-noise in the Shannon formula, because we assume that they are all uncorrelated.

Figure 1B:
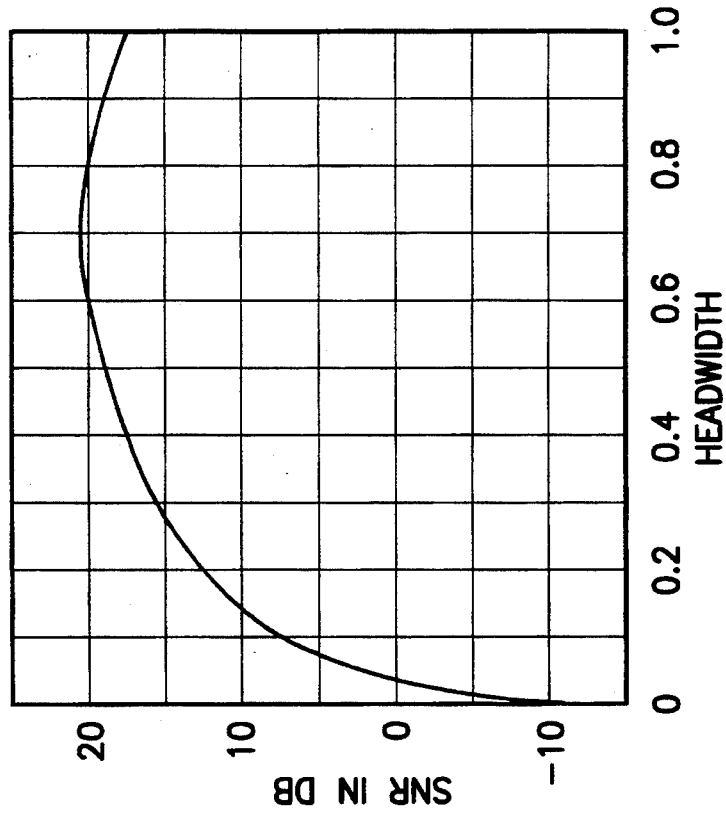
Figure 2B:
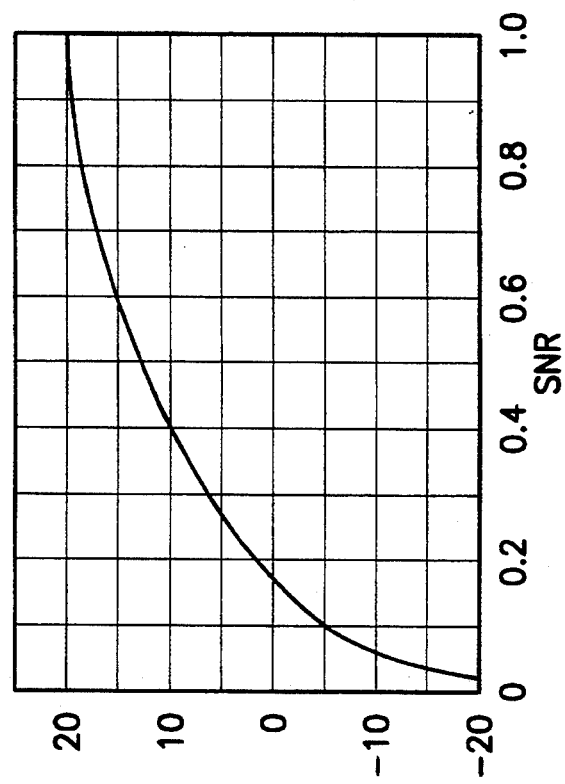
FIGS. 2A, 2B, 2C, and 2D are four graphs illustration the effects of ranging track width in the magnetic disk channel of FIG. 1. The horizontal axes label trackwidths.
Figure 2A:
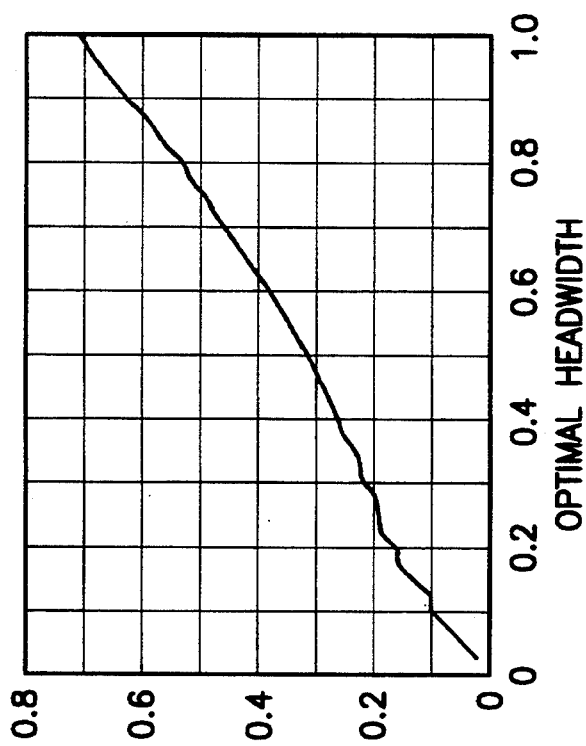
Figure 2D:
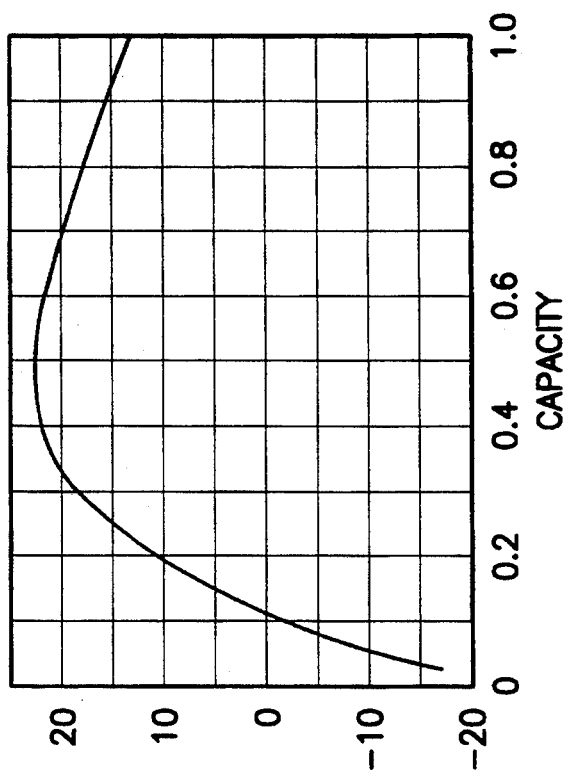
Figure 2C:
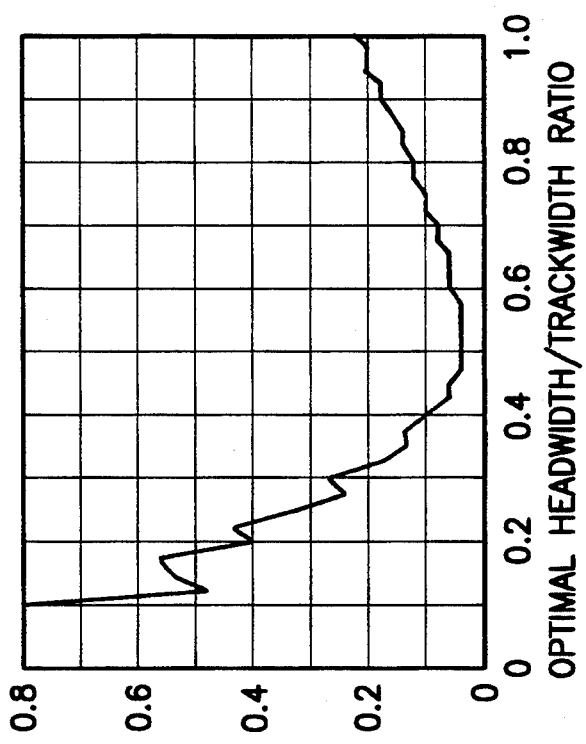

FIG. 1 gives SNR and capacity calculations for a typical channel with varying head widths. Track-width is 1, $\bar{P}=200$, $\bar{N}_M=150$, $\bar{N}_E=50$, servo standard deviation is $\sigma=0.15$. For a fixed trackwidth, capacity is a monotone function of SNR. As shown in FIG. 1, maximum capacity is achieved with a headwidth about 70 percent of the trackwidth.

We next consider what happens as we shrink the trackwidth. The optimal headwidth/trackwidth ratio will vary as a function of trackwidth. In FIG. 2 we see what happens as trackwidths vary from zero to our standard trackwidth of unity. The top left shows the SNR (in dB) of the channel with the optimal headwidth plotted against trackwidth, while the bottom left shows the corresponding capacity. The top right gives the optimal headwidth as a function of trackwidth, while the bottom right plots the corresponding optimal headwidth/trackwdith ratio. The wiggles appearing in this last plot are due to numerical errors in our discretization, which are greatly magnified by taking ratios. It is interesting to note that optimal capacity, as function of trackwidth, occurs when the optimal headwidth/trackwidth ratio achieves its minimum. Optimal capacity is achieved when trackwidths are decreased to approximately ½, yielding a channel with SNR more than 8 dB below that of our reference channel. The actual capacity gain is 25 percent.

Figure 3B:
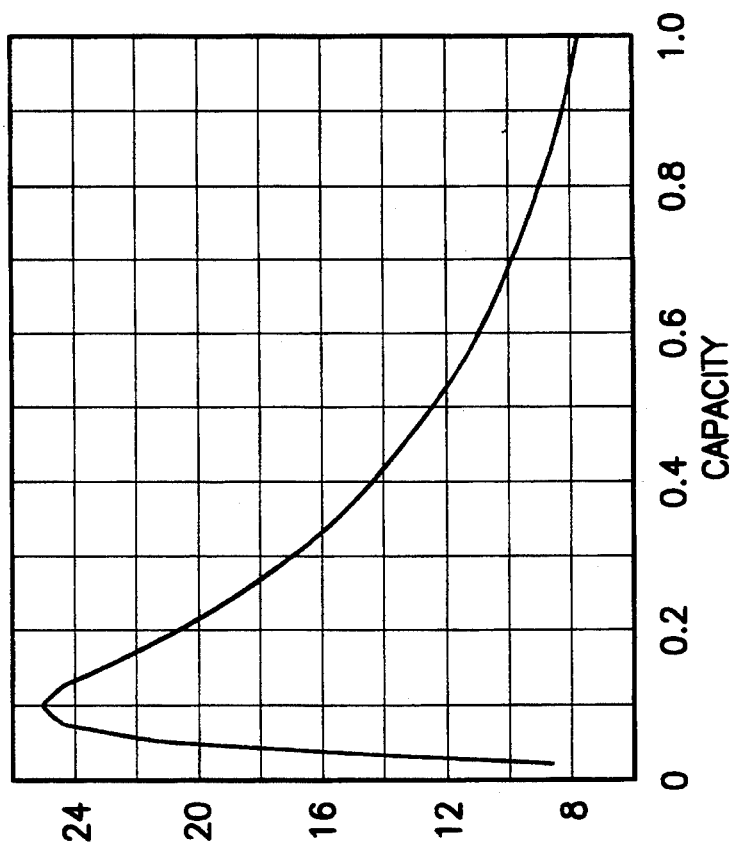
FIGS. 3A and 3B, same parameters as FIG. 1 except that $\sigma=0$.
Figure 3A:
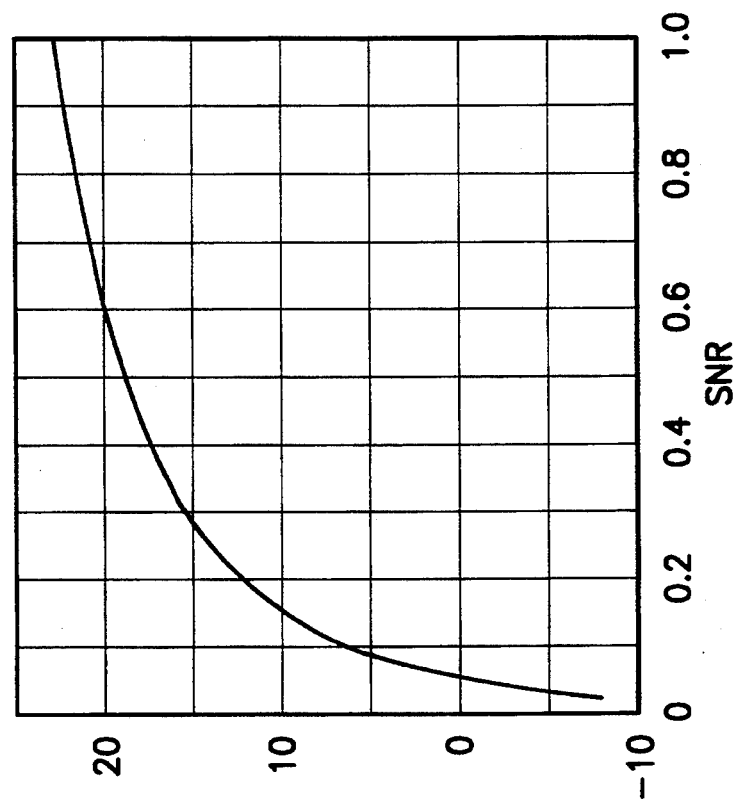
Figure 4B:
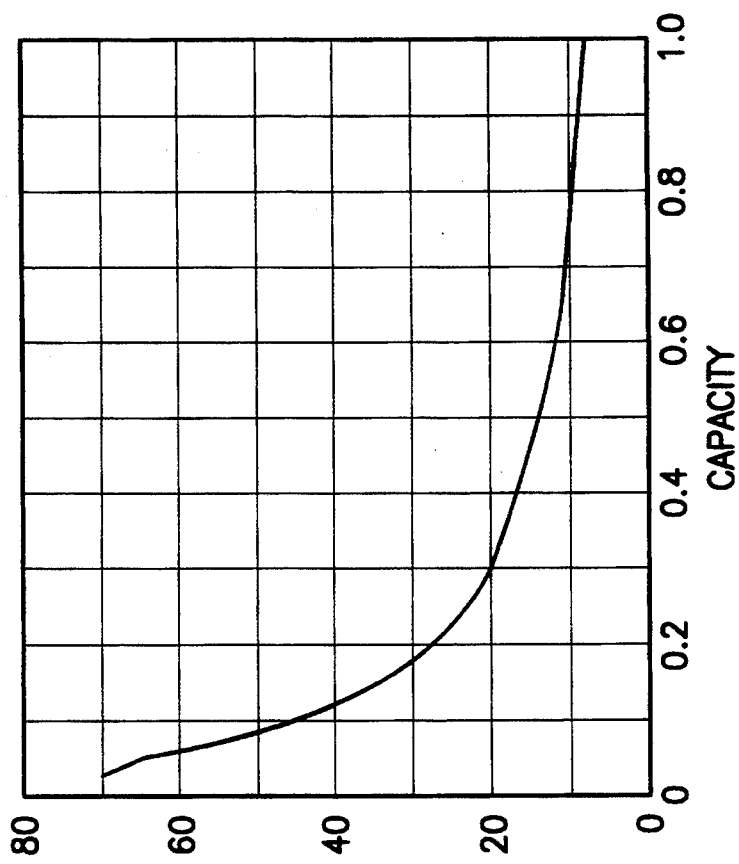
FIGS. 4A and 4B, same parameters as FIG. 3 except that $\bar{N}_E=0$.
Figure 4A:
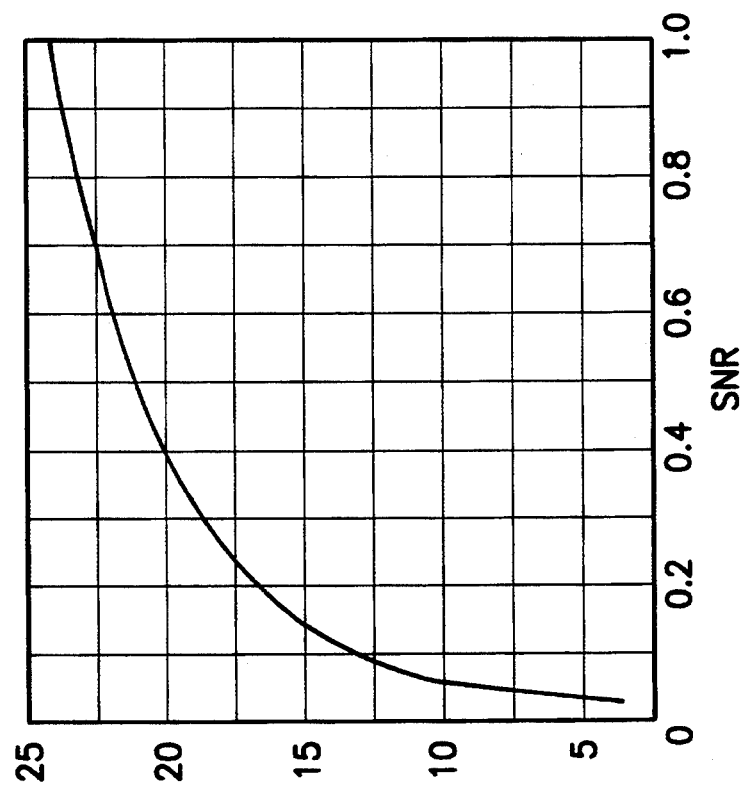

To highlight the role of TMR in degrading channel performance, we next consider the same channel except that we now assume perfect tracking, or $\sigma=0$. FIG. 3 right shows capacity as a function of trackwidth, and left shows the corresponding SNR. Because tracking is perfect, the optimal headwidth/trackwdith ratio is 1. Optimal capacity is now achieved at trackwidths one tenth those of the reference, and the capacity gain is more than three fold. To achieve this capacity however we must utilize a channel with very low SNR, around 6.7 dB. Of more immediate practical concern is that with perfect tracking we can double track density at a cost of 5.1 dB and gain about 65 percent in capacity. Results similar to this have been presented in [1]. Just to put things into historical perspective, the traditional picture of capacity as a function of trackwidth [4] is given in FIG. 4, where not only has servo variance been eliminated, but also electronic noise. Now capacity grows monotonically with increasing track densities. What is not evident from this picture is that this growth approaches an asymptotic limit as trackwidth goes to zero.

Figure 5B:
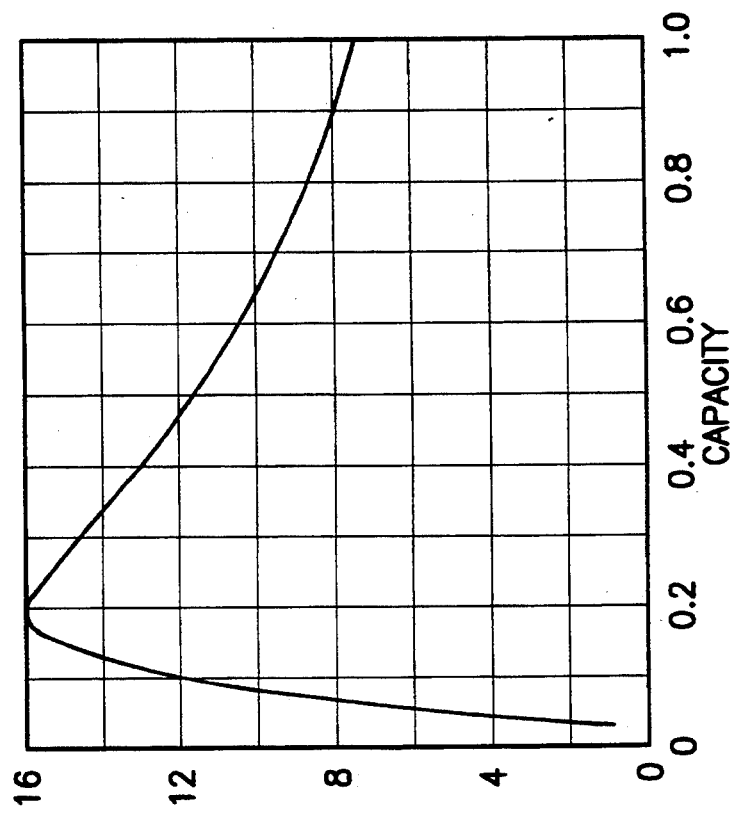
FIGS. 5A and 5B, same parameters as FIG. 1 except that the interfering signal $P_I$ is eliminated.
Figure 5A:
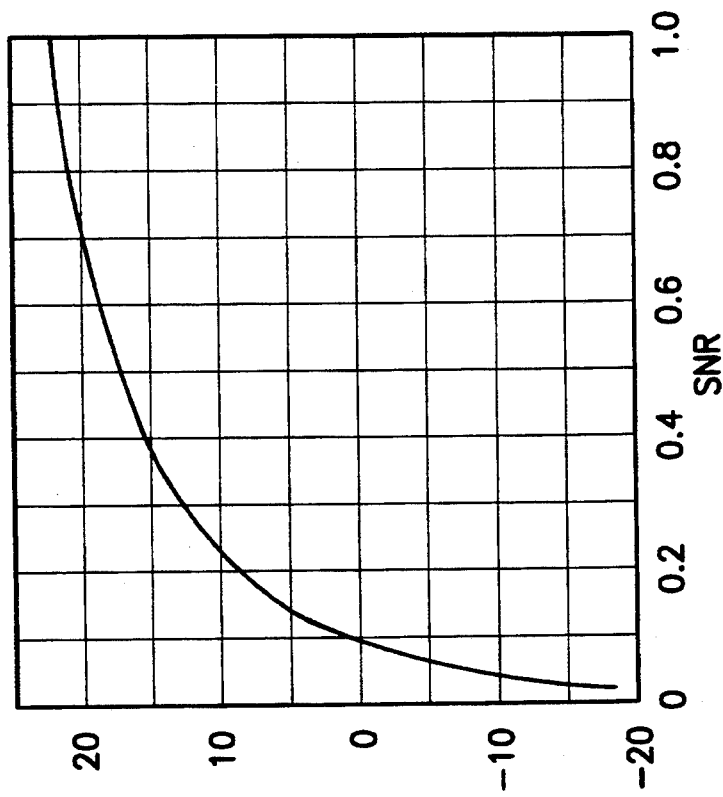
Figure 6A:
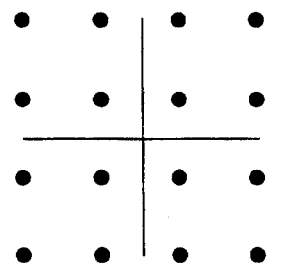
FIGS. 6A, 6B, 6C, and 6D, are scje,atoc representation of four constellations for fourier transform division multiplexing encoding.
Figure 6B:
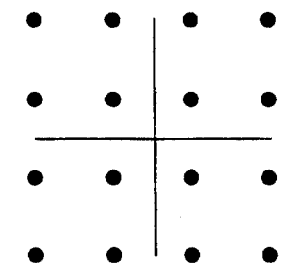
Figure 6C:
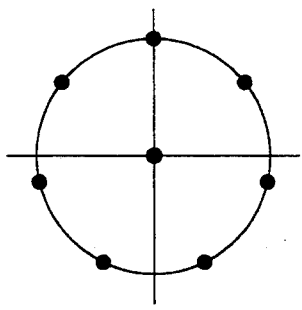
Figure 6D:
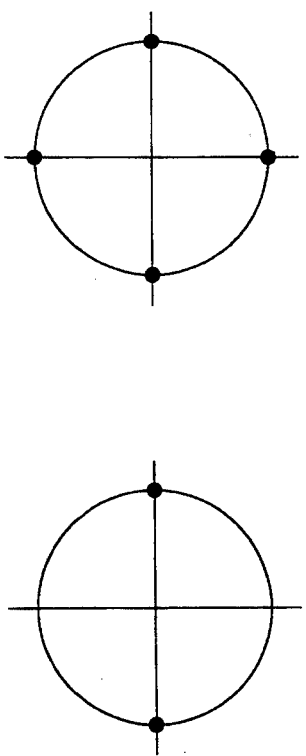

It is instructive to see just how much the interfering signal $P_I$ affects the SNR and capacity of the system. This is especially important because later, after orthogonalizing the signals of neighboring tracks, this component of the noise will not exist. In FIG. 5 we plot optimal capacity and corresponding SNR for the case $P_I=0$. Capacity is optimized with trackwidths one fifth the original size, with more than double the gain in capacity. At trackwidths 0.3 times the original, capacity is just about doubled, at a cost of 9 dB drop in SNR. At trackwidths one half times the original, capacity is increased by about 50 percent, with a corresponding drop in SNR less than 5 dB. More significantly, if we compare the half-trackwdith channel without interference to the reference channel with interference (cf. FIG. 2), we get a 75 percent gain in capacity with a drop in SNR less than 3 dB.

Suppose we could improve servo so that the tracking standard deviation is reduced to $\sigma=0.05$. If we write and read in the standard method, suffering from interfering signals from neighboring tracks, then at trackwidth 1 SNR is 22.45 dB. and capacity is 7.4. Thus, we gain 2.2 dB. over the reference channel, with only a very modest gain in capacity. At trackwidth 0.5, optimal capacity is 11.9 with headwidth 0.45, and corresponding SNR 17.86 dB. Optimal capacity is achieved at trackwidth 0.175 with headwidth 0.156, yielding capacity 16.9 at SNR 8.9 dB.

Finally, if we were to also remove interfering signals from neighboring tracks, at trackwidth 1 SNR is 22.7 dB. and capacity is 7.56. At trackwidth 0.5, optimal capacity is 12.3 (headwidth is also 0.5) and corresponding SNR 18.47 dB. Optimal capacity is achieved at trackwidth 0.125 yielding capacity 21.3 at SNR 7.25 dB. Comparing this last channel with trackwidth 0.5 to the reference with trackwidth 1, we gain 83 percent in capacity at a drop of less than 1.8 dB.

III. FTC BASICS

In this section we describe the basics of Fourier transform coding (FTC) and give examples of its implementation. The standard FTC scheme, based on the waterpouring theorem, is described in [8, 9, 15]. Mixed FTC and trellis-coded schemes are discussed in [7, 14]. More sophisticated methods are discussed in [23]. Basically, we divide the channel into disjoint narrowband subchannels and we store information in the high SNR subchannels, which we will call the "utilized" subchannels. We demand identical reliability (pre-correction error rate) from each of these utilized subchannels. The amount of energy to be allocated to each utilized subchannel is precisely that which is needed in order to achieve a desired probability of error. The number of subchannels used is determined by an average power constraint.

Information will be stored in contiguous blocks. For each block, each subchannel will store its information as one of several allowable complex numbers. These sets of allowable complex numbers, called constellations, will have $2^B$ members, where B is an integer. The members will be chosen so that their average magnitude squared is 1. The minimum distance between any two of members of a constellation is called its $d_{free}$. Four constellations are pictured in FIG. 6, corresponding to $B=1, 2, 3, 4$. The top left contains the two square roots of unity and the bottom left the four fourth roots of unity. The top right contains the origin and seven equally spaced points along the circumference of the circle with center the origin and radius $\sqrt{8/7}$. Frequently the 8 point constellation is chosen to be the standard 8-PSK one, whose members are all 8-th roots of unity. The sixteen point constellation at the bottom right contains the complex numbers $\pm ba \pm cai$, where $a=1/\sqrt{10}$ and b and c take on the values 1 and 3. These constellations have their $d_{free}=2, \sqrt{2}, 2\sqrt{8/7} \sin(1/7), 2/\sqrt{10}$, respectively. Each constellation member will be used to encode a distinct sequence of B bits.

The basic idea in FTC is to store an analogue signal whose values sampled at the Nyquist rate are such that, after applying a discrete Fourier transform (DFT) to a block of them, and then equalizing by simple complex division, the resulting sequence is 0 at the unutilized frequencies (subchannels) and precisely the encoded constellation members at the utilized frequencies. Because the channel is corrupted by noise, the actual DFT output will not be the encoded constellation member. The decoder will then choose the constellation member closest to the computed value as representing the stored bit sequence. (If we use coding in the frequency domain [7, 14], then the decoder will be considerably more complex.) The signal and channel response being real valued will mean that the output frequency response will be conjugate-symmetric about the origin. This symmetry, in effect, acts as a signal averager before decoding.

Let us denote the channel frequency response by H(f) and assume that the corrupting noise is additive Gaussian with spectral density N(f). We will assume that the channel is bandlimited, so that $H(f)=0$ for $|f|>W$. A signal coming out of this channel is uniquely determined by its values sampled at the Nyquist rate. We will encode contiguous blocks of data at consecutive time intervals of duration T, and the signal will have $N=2WT+1$ degrees of freedom at each such interval. We will sample the output at N equally spaced points in each interval, so that N values of the spectrum of the output, sampled at equally spaced points $f_j$ in the channel bandwidth, can be well approximated using a DET. We will address the issue of aliasing shortly. We view the channel as a union o independent narrowband subchannels $C_j$ each of bandwidth W/N with flat frequency response $H_j=H(f_j)$. Each subchannel $C_j$ is corrupted by additive white noise with variance $\sigma_j^2=N(f_j)$, which we will denote by $N_j$.

Suppose that we want to guarantee that the probability of an error at subchannel $C_j$ during any block interval is less than some $\epsilon$. We want to know how much energy $E_j^2$ to put into this subchannel to achieve this reliability. The signal to noise power ratio for this subchannel will be $$SNR_j = \frac{E_j^2 |H_j|^2}{N_j}$$

and the reliability criterion will translate to $$Q\left(\frac{d_{free}\sqrt{SNR_j}}{\sqrt{2}}\right) \leq \frac{\epsilon}{c}$$

where $$Q(x) = \frac{1}{\sqrt{2\pi}} \int_x^\infty e^{-x^2/2} dx$$

is the complementary cumulative probability function, and c is the maximum number of closest neighbors a member of a constellation has. For our constellations pictured in FIG. 6, c=1, 2, 7, 4, respectively. For the alternate 8-FSK constellation, c=2. The denominator $\sqrt{2}$ in the parenthesis (instead of the usual 2) appears because of the signal averaging.

From the reliability criterion we obtain the required energy input $$E_j^2 = \frac{2 Q^{-1}\left(\frac{\epsilon}{c}\right) N_j}{d_{free} |H_j|^2}$$

The complex number we use to encode the information in the j-th subchannel is a constellation member multiplied by $E_j$. We also impose a total energy constraint $$\sum_{j \in \Theta} E_j^2 = E^2$$

where the summation is over all utilized subchannels $\{C_j; j \in \Theta\}$. The subchannels we utilize are those with the highest signal to noise ratios; we use as many as we have to, until we satisfy the total energy constraint. Let M denote the cardinality of $\Theta$. We will assume, as will typically be the case with AC-biased magnetic recording channels [8, 20], that for some integer a, the first a frequency bands (counting from 0 upward) are not untilized, and that the next M bands are in $\Theta$.

The set $\Theta$ of utilized subchanels is a function of the types of constellations we choose. Different subchannels may use different constellations. We choose constellations which maximize the total number of bits we can store in the time interval T, subject to cost constraints. A bit string is mapped sequentially into M complex numbers (constellation members) $C_{a+1}, \ldots, C_{a+M}$. These are amplitude modulated according to our input power allocation recipe, to yield he sequence $E_{a+1}C_{a+1}, \ldots, E_{a+M}C_{a+M}$. We then form the sequence of WT complex umbers by assigning the value 0 to those indices not corresponding to utilized channels of positive frequency. To this string we adjoin 0 and then the reverse conjugate to itself. We obtain a string length 2WT+1 whose DFT is real valued. The analog write signal is the unique signal of bandwidth W whose sampled values at the Nyquist rate are the computed real values. Forming this analog signal involves passing the computed real valued sequence through a D/A converter followed by a lowpass filter.

Figure 7:
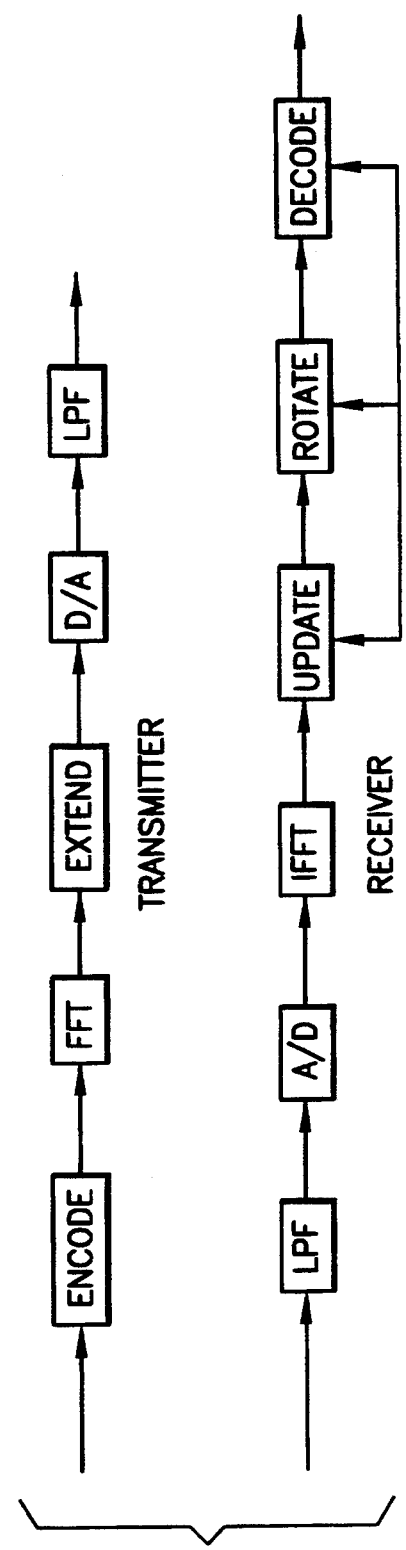
FIG. 7 is a block diagram of a transmitter channel and a receiver channel for a magnetic storage device of the invention.

In practice we add some redundancy to avoid aliasing in the decoder. We simply retransmit the beginning of the signal after the block has ended. The duration of the retransmit portion is the essential support of the channel impulse response (the duration of the channel memory). This has the effect of converting the linear convolution of the channel into a cyclic convolution. The idea was proposed by Winograd [8]. At the receiver, the output is lowpass filtered, sampled at the Nyquist rate and inverse Fourier transformed. For $j \in \Theta$, the decoder then decides which of the member of the constellation corresponding to subchannel $C_j$, when multiplied by $H_j E_j$, is closest to the computed output of the inverse Fourier transform at the j-th frequency bin, and returns the bit string corresponding to this number as the information in the subchannel. The entire transmitter/receiver layout is illustrated in FIG. 7. In the figure, the receiver also incorporates update and rotate routines which compensate for timing drifts and adaptively adjusts the equalizer parameters. Details can be found in [8, 15]. Later on, when we discuss superposition of other information on the linearized channel, we will present more efficient timing controls.

Figure 8A:
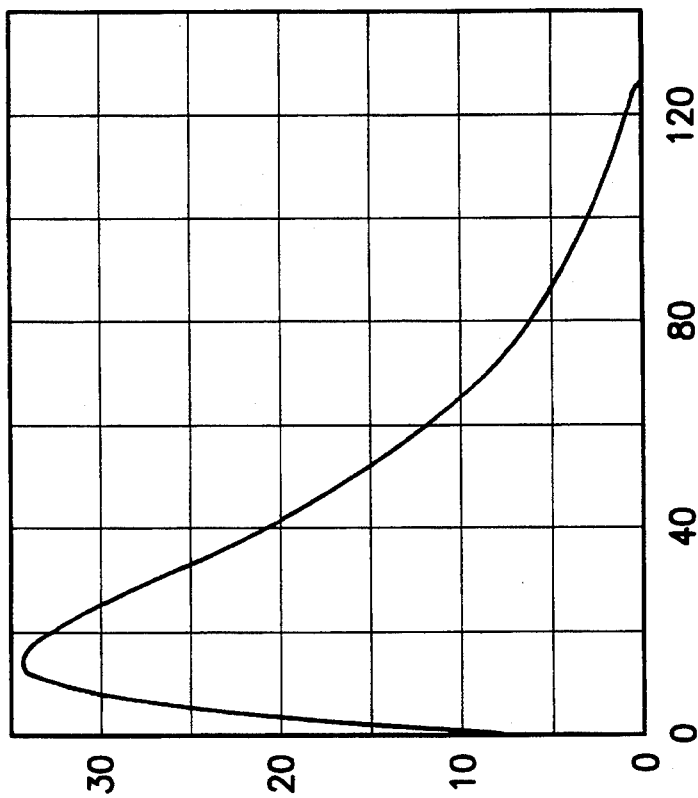
FIGS. 8A and 8B, FIG. 8A: computed channel frequency response and noise power spectrum of an example.
Figure 8B:
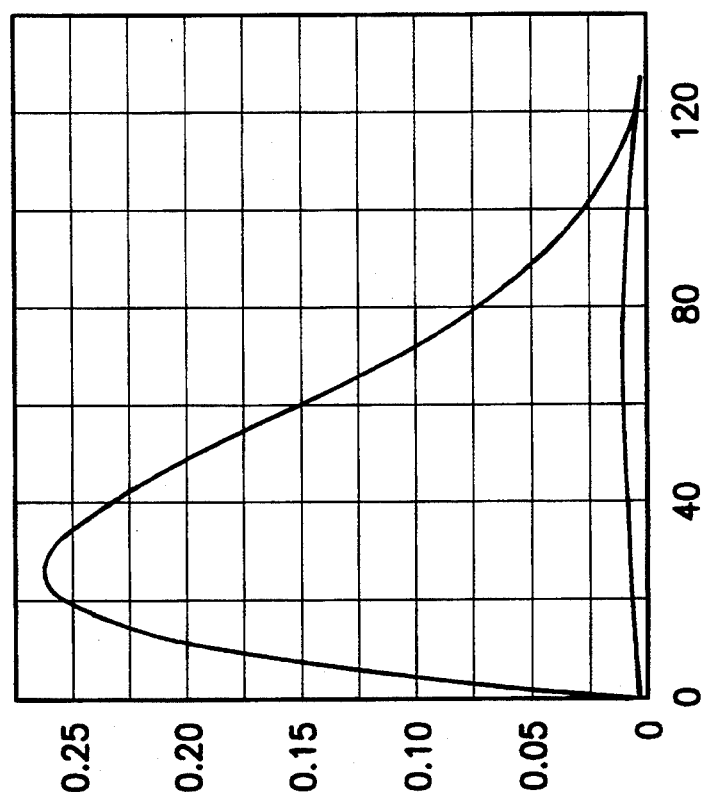

Our procedure is best illustrated by example. Consider the channel pictured in FIG. 8. Its frequency response H(f) satisfies $$|H(f)|^2 = e^{-4|f|/\pi} |\sin f| \quad |f| < \pi$$

and 0 elsewhere, and it is corrupted by additive Gaussian noise with power spectrum $$N(f) = 0.003 + 0.01 |\sin f|$$

The channel is divided into 128 narrow-band subchannels. The square magnitude of the channel response and noise power spectrum are pictured at the left of the figure. The horizontal axes are labeled with the indices of the subchannels and not with the frequency values. The ratio function $|H(f)|^2/N(f)$ is pictured at right. Our block lengths contain 256 samples (at the Nyquist rate); we will ignore the added redundancy for anti-aliasing. And we will demand a $10^{-7}$ pre-correction probability of error.

Figure 9A:
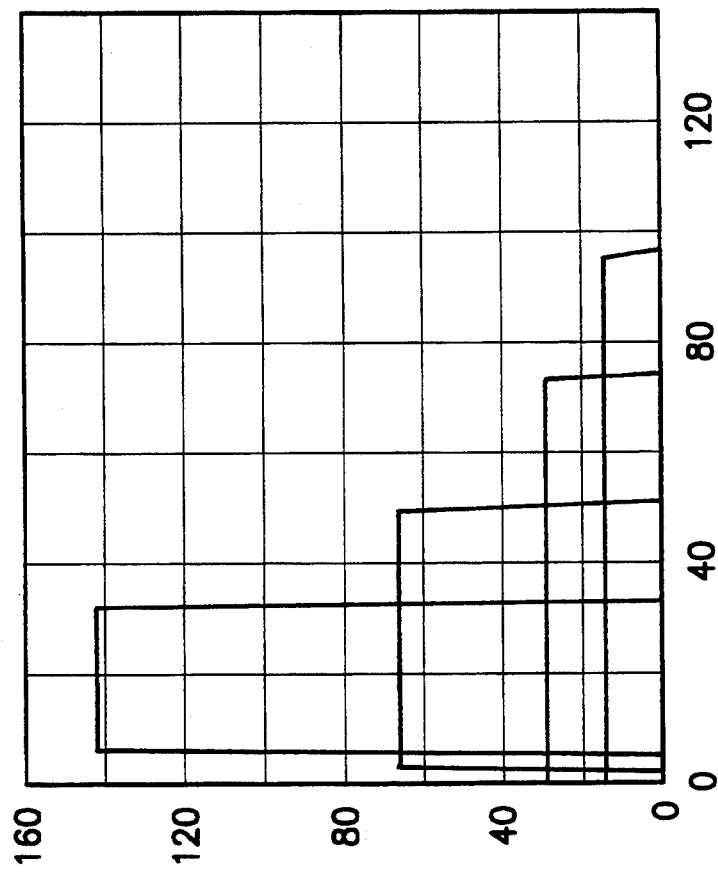
FIGS. 9A and 9B, FIG. 9A: four input power allocations given in Table 1; right: corresponding computed output signal-to-noise ratio.
Figure 9B:
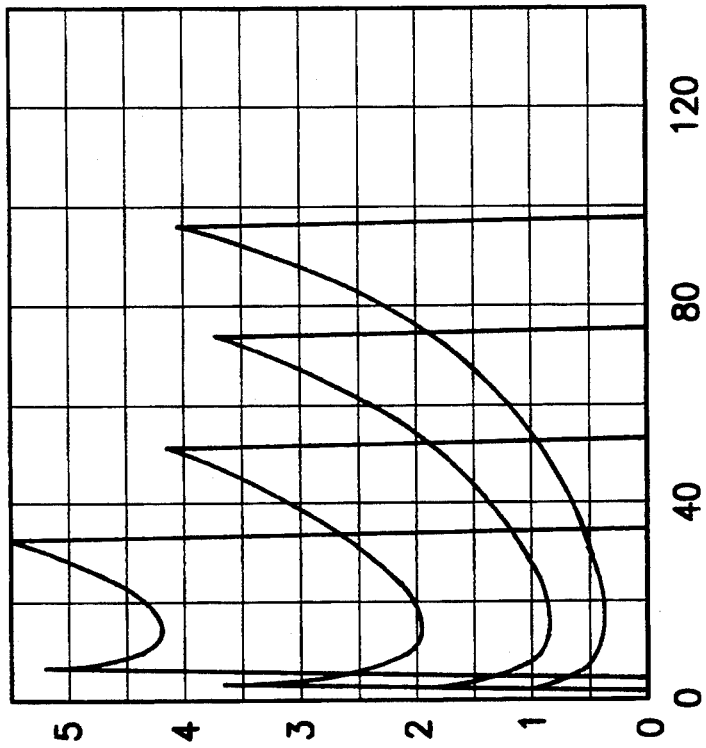

In our first implementation of FTC we allocate identical amount of information in each of the subchannels. In FIG. 9 we plot input power allocations for the four constellations of FIG. 8, and the corresponding output signal to noise power ratios as functions of frequency. The table below gives the number of bins and corresponding number of utilized bits per block, and the output SNR for each of the four allocations. The output SNR is precisely that which is required to achieve our reliability criterion.

TABLE 1

| B | Num. of Bins | Num. of bits | Output SNR | SNR in dB |
|---|---|---|---|---|
| 1 | 96 | 96 | 14.2 | 11.52 |
| 2 | 74 | 148 | 28.4 | 14.53 |
| 3 | 48 | 144 | 65.9 | 18.2 |
| 4 | 27 | 108 | 141.9 | 21.52 |

The table may suggest that we use the 74 bin allocation. But the discussion in section V will show that the 48 bin allocation is more desirable for guarding against clipping errors.

If one were to also use trellis coding [10] as suggested in [7], one could encode 2 bits in each of the 96 bins corresponding to B=2 in the table above, yielding 192 bits per block. The price is the added complexity of a four state Viterbi decoder. But here too the variance in the 96 bin power allocation is greater than that of the 48 bin allocation, making it more susceptible to errors due to clipping at peak amplitude values.

Figure 10B:
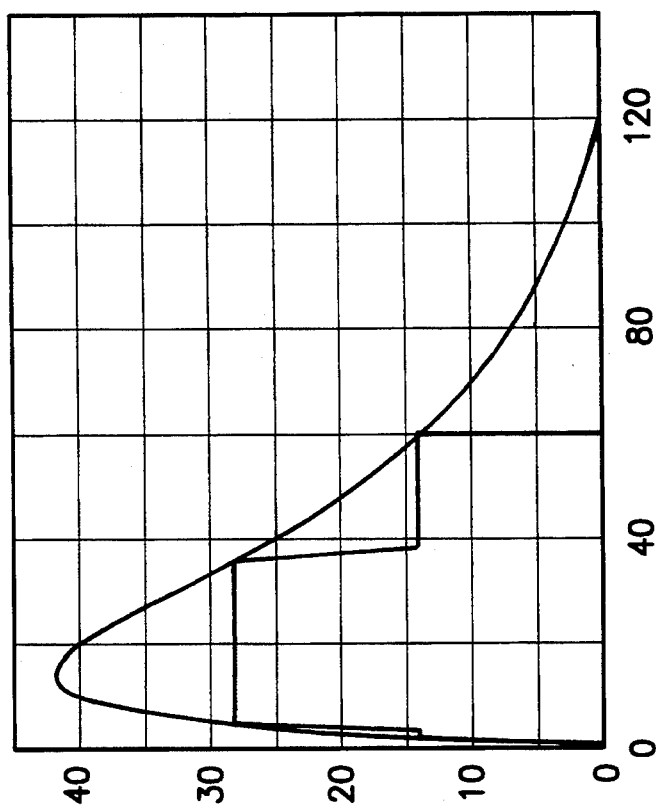
FIGS. 10A and 10B, FIG. 10A: classical waterpouring power allocation.
Figure 10A:
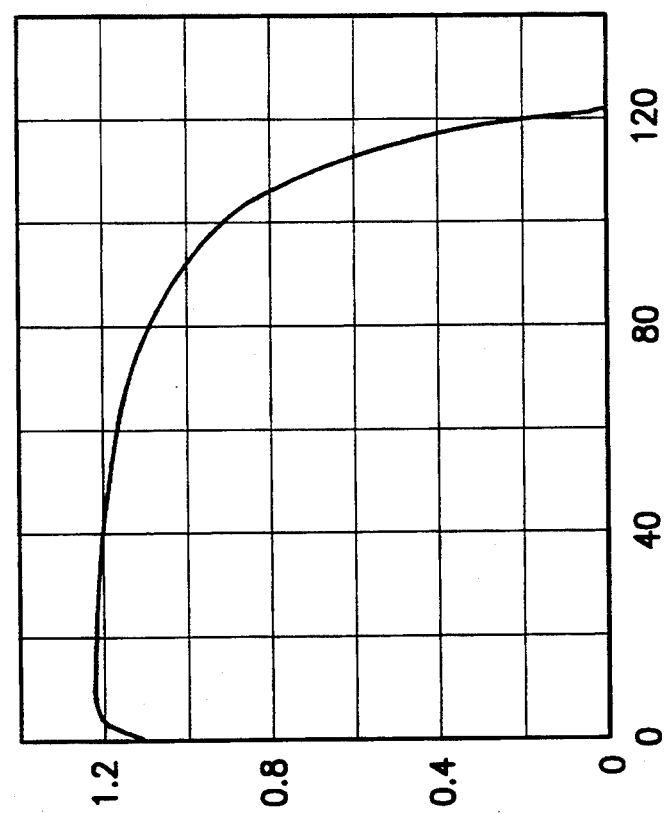

The reader may find it instructive to compare these allocations with those suggested by the water-pouring theorem [11, 12], as implemented in [8, 9, 13, 15]. While the latter are based on optimal strategies, in practice they often yield rates considerably inferior to the ones obtained via the heuristics we use. This is quite apparent in our case. FIG. 10 exhibits the input power allocation via the recipe given in [8, 9] and the corresponding output signal to noise power ratio. In the right hand side of the figure, the piecewise linear curve gives the SNR output required for the prescribed reliability. We can see how much of the energy in wasted, as along most of the channel the output reliability is much greater than we seek. The allocation gives 26 bins with one bit in each and 32 bins with two bits in each, for a total of 90 bits per block.

Figure 11A:
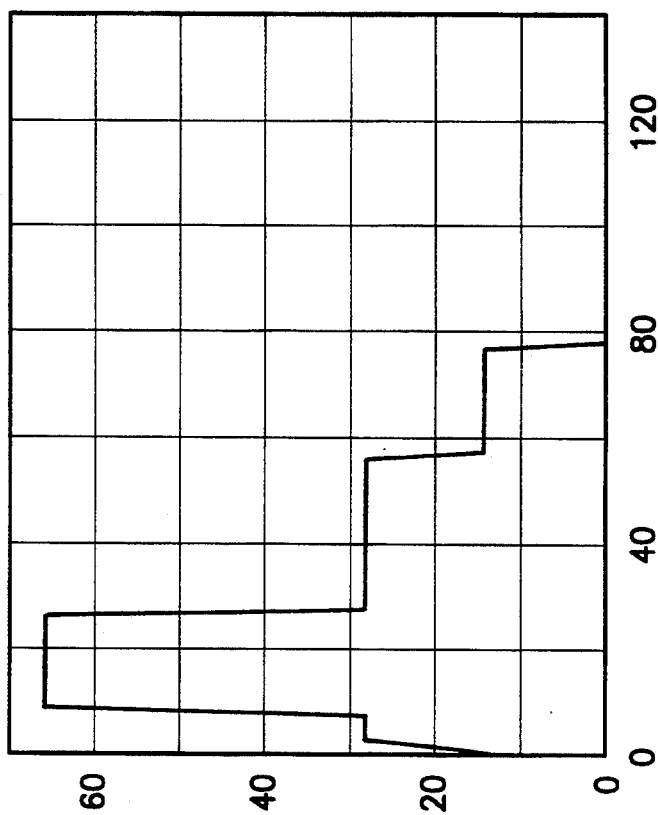
FIGS. 11A and 11B, FIG. 11A: input power allocation using three constellations.
Figure 11B:

If one tries to utilize the various constellations simultaneously, one obtains further gains. Such an allocation is given in FIG. 11, yielding 21, 37, and 19 bins each storing 1, 2, and 3 bits respectively, for a total of 152 bits per block. More significantly, as we will see in section V, the real gains here are in the greater uniformity of the input power allocation along the utilized bins. This will diminish the effects of clipping at peak amplitude levels. If one were also to incorporate the two simplest trellis codes of [10], the four state 8-PSK code with $d_{free}=2$ and the eight state 16-CROSS code with $d_{free}=1$, one would obtain an allocation of 48 and 33 bins each storing 2 and 3 bits respectively, for a total of 195 bits per block, with a moderately uniform input power allocation.

Alternating Fourier Transform Coding for high track density

Figure 12B:
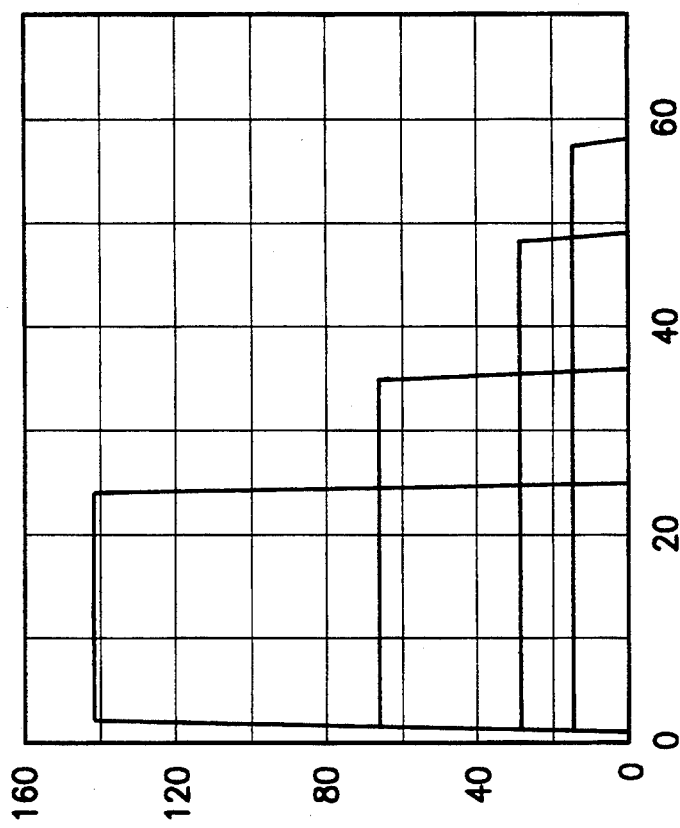
FIGS. 12A and 12B, FIG. 12A: Four input power allocations given in Table 2.
Figure 12A:
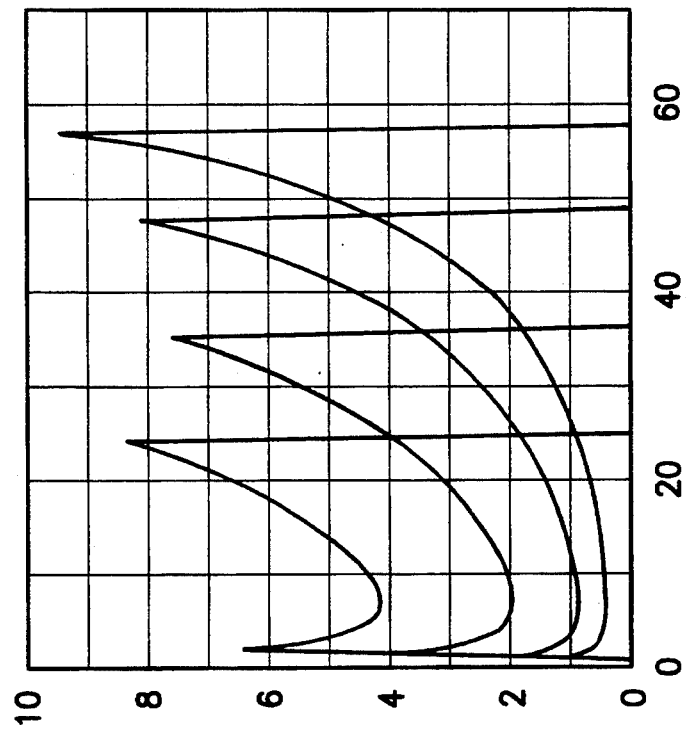
Figure 13:
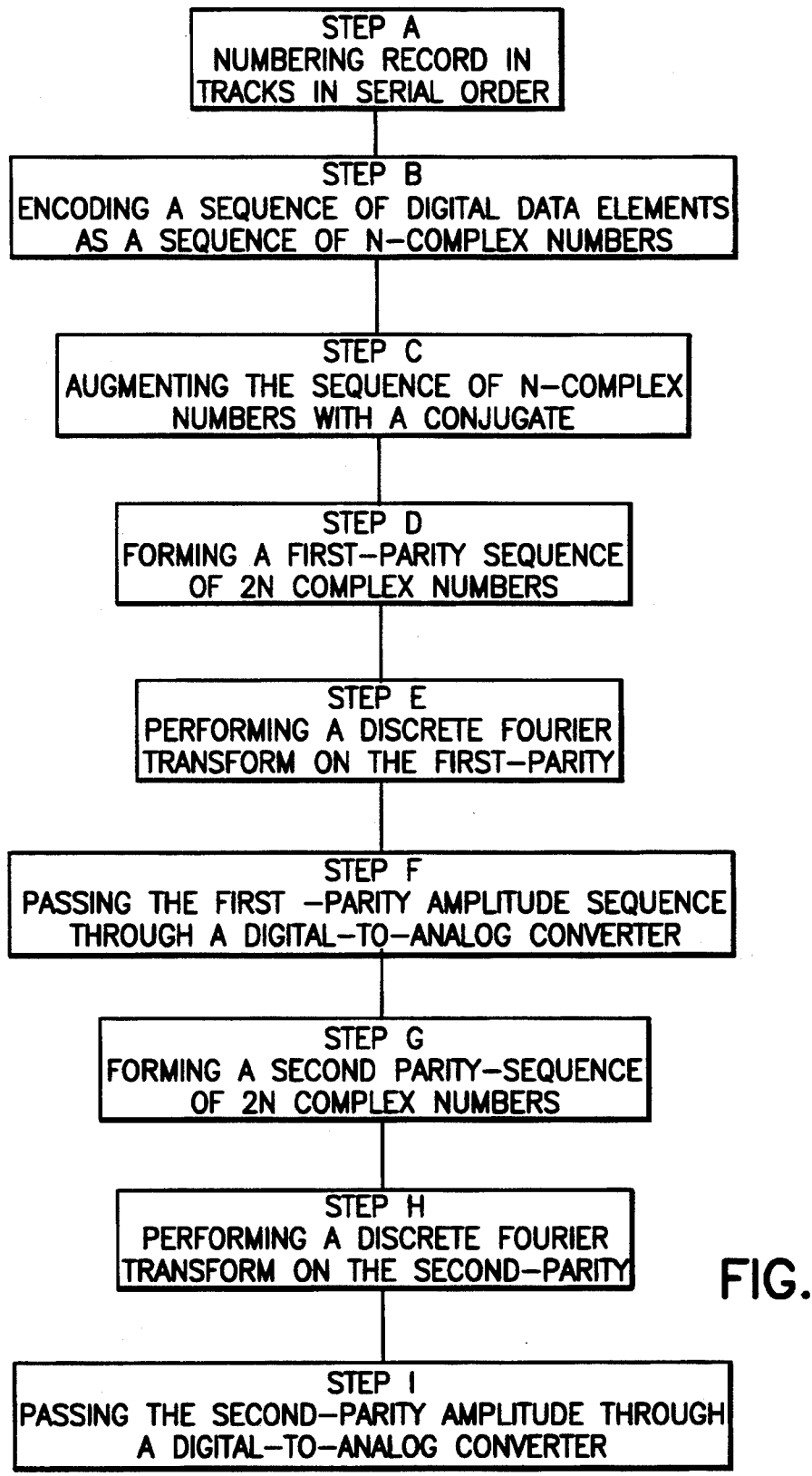
FIG. 13 shows a schematic diagram of the method according to the present invention.

Orthogonal signals can be efficiently written on alternating tracks. The procedure involves using only even numbered subchannels $C_j$ for even numbered tracks and only odd numbered subchannels for odd numbered tracks. Even and odd numbered tracks will have disjoint sets of utilized subchannels channels $\Theta_e$ and $\Theta_o$, respectively, Each track will still have the same total energy constraint, and this will considerably alter the energy assignment. It will not be true that the union $\Theta_e \cup \Theta_o$ will equal $\Theta$. Nor will it be the case that the cardinality of $\Theta_e$ and $\Theta_o$ will equal that of $\Theta$. The new energy allocations will have to be recomputed anew. It will be shown how to implement this scheme on the model channel introduced in the previous section, again first allocating identical amount of information in each utilized subchannel. Input allocations and output SNR's for the even channel are pictured in FIG. 12. The x-axes are labeled from 1 to 64, but it should be understood that these correspond to the even numbered bins of the previous example.

Table 2 below gives the number of bins and corresponding number of bits per block for the various allocation strategies.

TABLE 2

| B | Num. Even Bins | Num. of bits | Num. Odd Bins | Num. of bits |
|---|---|---|---|---|
| 1 | 57 | 57 | 58 | 58 |
| 2 | 48 | 96 | 48 | 96 |
| 3 | 35 | 105 | 34 | 102 |
| 4 | 23 | 92 | 23 | 92 |

In this example it is found that a good strategy is to use fewer frequency bins with more information per bin. This is because the best parts of the channel are only half utilized by the alternating scheme, so that one must go further into the lower signal-to-noise ratio parts of the channel in the energy allocations. It is therefore advantageous to better utilize the higher signal-to-noise ratio portions of the channel by allocating more information there.

Having alternating orthogonal signals enables one to radically change one approach to controlling errors due to track misalignment. Except for the settle-down period, deviations from center-track are slowly varying phenomena, when compared to actual data flow. As the data for a block is processed, one can determine when the magnetic recording device is beginning to encroach upon a neighboring track by observing energy in those frequency bins which should not be utilized. This opens many possibilities for error control. Most important is that if the head is slightly off track, without coherent interference there may still be enough signal to maintain reliability. Second, the channel can be treated as a "gross erasure channel." That is, when too much energy is observed in the wrong frequency bins, the entire block can be declared unreliable and reread. Doing this practically eliminates errors due to track misalignment, but increases latency as a function of the probability of such misalignment. Third, track information can be encoded in one of the bins in each block. For example, one of three cubic roots of unity can be encoded, cyclically as are traversed the tracks, so that by observing the computed output at this particular bin one can tell whether the head is moving off track to the right or to the left. The amount of deviation may be obtained directly by observing the total energy in the unutilized frequency bins. This will enable one to generate a strong continuous servo signal, thereby facilitating much better tracking.

Table 2 gives bit allocations for uncoded data only. If one uses Ungerboeck's four state 8-PSK trellis code with B=2, one would utilize 57 bins to encode 114 bits. If one uses his eight-state trellis code with B=3, one would utilize 37 bins to encode 111 bits. If one uses both constellations simultaneously one may utilize 19 and 30 bins each encoding 2 and 3 bits, respectively, for a total of 128 bits per block.

Peak Limiting

The constructions above yield signals which are energy constrained. To guarantee that the AC-biased recording channel well approximates a linear channel, signals are needed which are peak-limited. That is, the time signal s(t) should satisfy the absolute value inequality $|s(t)| \leq P$, for some predetermined positive value P. Therefore, before passing the FTC signal to the write head it must be passed through a hard limiter which clips the signal at levels $\pm P$.

If the average energy per bin is $E^2/N$ then the error at the j-th subchannel due to clipping at thresholds $\pm P$ is "approximately" Gaussian with mean 0 and variance $|H_j|^2 V(E, P)$, where $$V(E, P) = \frac{1}{E\sqrt{2\pi}} \int_P^\infty (x-P)^2 e^{-x^2/2E^2} dx$$

The reason the result is approximate is that the result is a consequence of the law of large numbers. The statistics of these errors become more and more Gaussian looking the more even the input power allocation in the utilized bins get and the more bins utilized. When the input power allocation is dominated by relatively few subchannels, the tails of the error distributions become larger. This is why we preferred the 48 bin allocation of Table 1 is preferable to the 74 bin allocation, even though the latter yielded a slightly greater number of bins per block. The above expression for the variance is true for all bins except the one corresponding to DC, where the variance doubles. In AC-bias recording we will not use DC anyway.

A good practical design rule for implementing FTC on a peak limited channel is to incorporate this variance as part of the noise and rewrite the above reliability criterion as $$Q\left(\frac{d_{free}\sqrt{SNR_j(E, P)}}{\sqrt{2}}\right) \leq \frac{\epsilon}{c}$$

where $$SNR_j(E, P) = \frac{E_j^2 |H_j|^2}{N_j + |H_j|^2 V(E, P)}$$

Here we have added the error due to clipping has been added to the noise component. Now the total energy constraint $$E^2 = \sum_{j \in \Theta} E_j^2$$

is another design parameter, because the clipping errors are functions of the total energy. The optimization problem is quite complicated now, and cannot be solved using standard variational methods as was done for the classical waterpouring theorem. One can can solve the problem numerically.

Burst Errors

With narrower tracks the additive white noise assumption may no longer be valid. One must also be concerned about the possibility of error bursts caused by media defects that are large with respect to the track widths. One basic advantage of the averaging inherent in the fourier-transform coding method is that burst errors are spread among all the subchannels, including the ones not utilized, so that at each bin the expected value of the contribution due to this burst error is small. For example, if the burst sequence is modeled as samples from an additive white noise source of unusually large standard deviation $\sigma_b$, occurring at samples A through A+B, then the probability that the real part of the computed error due to this noise is greater than some R is then given by $$2Q\left(\frac{R\sqrt{N}}{\sigma_b\sqrt{\sum_{j=A}^{A+B}\cos^2\left(\frac{2\pi jk}{N}\right)}}\right)$$

Similarly, the probability that the imaginary part of the computed error due to this noise is greater than some R is then given by $$2Q\left(\frac{R\sqrt{N}}{\sigma_b\sqrt{\sum_{j=A}^{A+B}\sin^2\left(\frac{2\pi jk}{N}\right)}}\right)$$

It can be readily seen how increasing the block length N alleviates the problem of such burst errors. In practice, we always limit the amplitude of the output so that the magnitude of the burst noise is bounded, thereby guaranteeing that $\sigma_b$ does not become too large. We must be careful not to limit at too low a level thereby affecting the good portion of the signal.

It may happen that the noise is a large coherent signal over some interval. In this case its effect, after Fourier transformation, is mostly around DC. With linearized magnetic recording channels this region is not utilized by the code. Therefore, if after decoding with the FTC we observe large values at this region we can detect the presence of this type of noise. It is not clear however that by isolating this portion of the signal will can obtain an approximation to the burst error which may be useful for further processing.

In very low SNR environments, where we encode only one bit per bin as a real number $\pm a$, we have extra information to help protect us from burst errors. The computed values of the Fourier transform should ideally be real and symmetric. Imaginary components of the output must be due to noise. Thus inverse Fourier transforming these phase terms, subtracting the result from the signal and then Fourier transforming back halves the variance of the noise.

Recall how we used orthogonality to create what we have called a "gross erasure channel" in section IV. We can use the same idea here. If the unutilized frequency bins have too much energy, then we may simply declare the particular block to be unreliable. Unlike the previous case, however, here we can no longer simply ask to reread the block, as media defects or inadvertent overwrites cause permanent damage. However, with the ability to detect such faults, write/read protocols may be designed to handle them.

Superposing other information

We can devote certain frequency bins to information other than data. As we have already mentioned in section IV, we can devote one bin for information to help with tracking. We need very little bandwidth for this information, because the critical information informing us that we are going off-track is more than plentiful- it is the entire content of the neighboring tracks. We need only encode one bin to tell us whether we are moving to the right or to the left.

We can incorporate buried servo into our scheme. In this scheme, very low frequency servo information is buried deep in the media, and is intended to remain there for the life of the channel. It is to be used during the write procedure in order to produce more perfect tracks and during the read process for better tracking.

Timing information. The signal produced via the FTC is Gaussian in nature, and timing recovery cannot be done with standard phase-lock loop techniques on this type of signal. When the timing deviations are slowly varying, it was shown in [8, 15] how the data itself could be used to correct for such drifts. Basically, a slow drift causes a time shift in the signal which corresponds to a linear phase shift in the Fourier transform, which is the coded data. The data contains enough information to estimate the rotation induced by this phase shift. To handle the finer timing variations, one should superpose timing information at frequencies far from those utilized for data. These can be high-pass filtered and timing recovery can be done on the fly.

One can think of many other types of information to superpose-track identification, for one. Basically, any information which is commonly stored on the disk in specific sectors can be spread throughout the disk in specially allocated frequency bins.

I claim:

1. A method for magnetically recording data on a magnetic recording medium having a plurality of recording tracks extending generally linearly in a side by side arrangement, the method comprising the steps of:
    (a) numbering the recording tracks in a serial order so that adjacent tracks are assigned track numbers of different parity, an odd set of alternate recording tracks thereby being associated with odd track numbers and an even set of alternate tracks being associated with even track numbers;
    (b) encoding a sequence of digital data elements as a sequence of N complex numbers pursuant to a predetermined encoding scheme;
    (c) augmenting the sequence of N complex numbers with a conjugate sequence in a reverse order to obtain an augmented sequence of 2N complex numbers, each complex number in the sequence being associated with an integer index value corresponding to its position in the sequence;
    (d) forming a first parity sequence of 2N complex numbers by taking in order the N first-parity-indexed complex numbers from the augmented sequence having index values of a first parity and interleaving said N first-parity-indexed complex numbers with N zeroes;
    (e) performing a discrete Fourier transform on the first parity sequence to obtain a first-parity amplitude sequence of 2N real numbers;
    (f) passing the first-parity amplitude sequence through a digital-to-analog converter and magnetically recording the resulting signal in a linear fashion on a recording track associated with an odd track number;
    (g) forming a second parity sequence of 2N complex numbers by taking in order the N second-parity-indexed complex numbers from the augmented sequence having index values of the second parity opposite to the first parity and interleaving said N second-parity-indexed complex numbers with N zeroes;
    (h) performing a discrete Fourier transform on the second parity sequence to obtain a second-parity amplitude sequence of 2N real numbers; and
    (i) passing the second-parity amplitude sequence through a digital-to-analog converter and magnetically recording the resulting signal in a linear fashion on a recording track associated with an even track number.

2. The method of claim 1 in which the first parity is odd and the second parity is even.

3. The method of claim 2 in which N is an integer power of two.

4. The method of claim 3 in which N is in the range of from 256 to 4096.

* * * * *